May 5, 1970     D. A. LARSON ET AL     3,510,189

METHOD OF DOSING INCANDESCIBLE LAMPS WITH HALOGEN

Filed Nov. 13, 1967

WITNESSES
*Theodore F. Wrobel*
*Walter Sutcliff*

INVENTORS
Daniel A. Larson, John D. Smith
and Jack Martin
BY *W. D. Palmer*
ATTORNEY United States Patent Office 3,510,189
Patented May 5, 1970

3,510,189
METHOD OF DOSING INCANDESCIBLE LAMPS WITH HALOGEN
Daniel A. Larson, Cedar Grove, John D. Smith, Caldwell, and Jack Martin, Paramus, N.J., assignors to Westinghouse Electric Corporation, Pittsburgh, Pa., a corporation of Pennsylvania
Filed Nov. 13, 1967, Ser. No. 682,395
Int. Cl. H01j 9/38, 17/36
U.S. Cl. 316—3                                   7 Claims

ABSTRACT OF THE DISCLOSURE

A method of accurately dosing incandescible lamps with a halogen wherein the lamp envelope and an additional hollow-container means which contains a preselected organic halogen compound are evacuated, gas filled, and sealed. The halogen compound is heated and the halogen is evolved to diffuse throughout the lamp envelope. The lamp is then tipped off and separated from the hollow-container means.

BACKGROUND OF THE INVENTION

This invention relates to a novel method of dosing an incandescible lamp with halogen fill.

The operation of quartz-iodine lamps as well as other tungsten-halogen cycle lamps is well known in the art. The tungsten-halogen cycle is dependent on a high purity and accurately predetermined halogen dosage. Various dosing methods are presently practiced. Audesse Pat. 3,063,778, dated Nov. 13, 1962 teaches condensing iodine vapor in the evacuating tubulation, then after exhausting, gas filling and sealing the lamp and evacuating tubulation, heating the iodine to provide the required dose. Brundige Pat. 3,208,812, dated Sept. 28, 1965 and owned by the present assignee, teaches adding the fill gas and iodine during repetitive flushing operations to achieve the proper ratio.

Another method known in the art is to decompose a gaseous halogen compound on the lamp filament to effect the dosing. The effect of this method is to incorporate the residue in the sealed lamp.

The problem in dosing with a halogen is the reactive nature of the elments. Consequent handling and valve problems make it desirable to evolve the halogen inside the lamp or a connected system at the very last step of lamp manufacture.

SUMMARY

It is the object of this invention to provide a method for producing halogen additive type lamps containing a predetermined quantity of a halogen element utilizing a simplified evacuation and fill operation.

It is an object to provide a novel method for dosing halogen additive lamps so that the halogen dose is accurately predetermined and reproducably effected.

These objects are accomplished by utilizing the readily heat decomposable halogen compounds tetraiodoethylene, carbon tetraoidide, diodoacetylene, hexabromoethane, for example, to dose the lamp with the halogen. The halogen compound is contained in a hollow-container means that opens into the lamp envelope. The lamp and the interconnected hollow-container means are evacuated and filled with a predetermined amount of a preselected fill gas such as argon or one of the other inert gases. The system is then sealed off from the evacuating source and the atmosphere. The halogen compound is then heated to evolve a predetermined amount of halogen vapor which diffuses throughout the lamp. The lamp envelope is then seal off to separate the interconnected hollow-container means which contains the residual decomposition product of the halogen compound.

BRIEF DESCRIPTION OF THE DRAWINGS

For a better understanding of the invention reference should be made to the following drawings, wherein.

DESCRIPTION OF THE PREFERRED EMBODIMENTS

Figure 1:
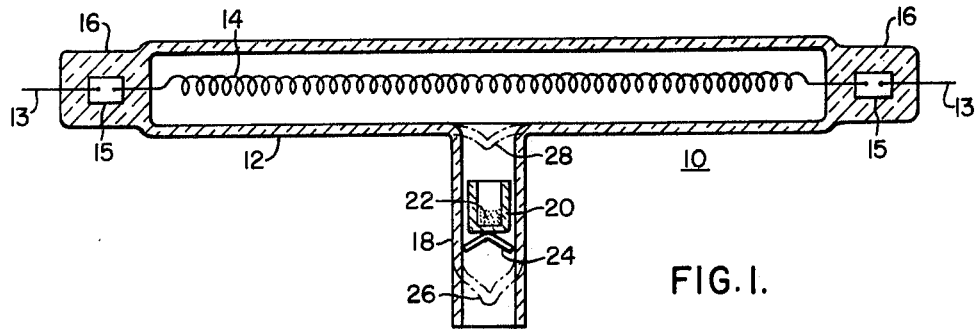
FIG. 1 illustrates the lamp, the evacuating tubulation, and a cup-shaped container holding the heat decomposable halogen compound supported within the evacuating tubulation.

With specific reference to the drawing in FIG. 1, the lamp embodiment 10 and has a vitreous light-transmitting tubular quartz envelope 12 and a coiled tungsten filament 14 which is electrically connected to the molybdenum ribbons 15 sealed in the press seals 16 at each end of the envelope 12 as is well known in the art. Conductive lead-ins 13 extend from the molybdenum ribbons 15 and are brought through the press seal 16. The quartz envelope 12 has a volume of about 3.5 cc. The evacuating tubulation 18 is the interconnected hollow-container means in the preferred embodiment. A glass cup-shaped member 20 containing about 1.8 milligrams of tetradiodoethylene crystals 22 is vertically supported within the evacuating tubular 18 by the retaining clip 24. The retaining clip 24 is formed of a material such as tungsten or other such material which is non-reactive at the temperature required to decompose the halogen compound. The evacuating tubulation 18 connects to an evacuating source and also to a supply of fill gas such as argon. The lamp envelope 12 is evacuated and may be baked out with the evacuating tubulation 18 being cooled to prevent the $C_2I_4$ from vaporizing. The envelope 12 is then filled with argon to a pressure of 2 to 2½ atmospheres, which can be more readily accomplished by cooling the lamp envelope in liquid nitrogen. The evacuating tubulation 18 is then tipped-off long at point 26. The lamps and the evacuating tubulation 18 in the area of the cup-shaped member are heated to about 220° C. and maintained at that temperature for about four minutes to evolve the necessary amount of iodine. The iodine diffuses throughout the lamp and the envelope is tipped-off short at position 28. The desired iodine concentration is from 0.1 to 1 micromole per cc. of lamp volume.

Figure 2:
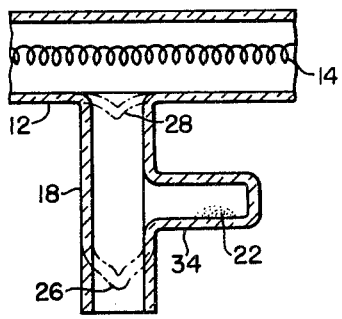
FIG. 2 illustrates a fragmentary view of the lamp, the evacuating tubulation, and a side-arm chamber containing the decomposable halogen compound.

In an alternative embodiment as shown in FIG. 2, a side-arm chamber 34 is provided as part of the interconnected hollow-container means with the evacuating tubulation 18 and the $C_2I_4$ crystals 22 contained therein. Similarly, about 1.8 milligrams of $C_2I_4$ is supplied and after bake-out, evacuation, argon filling and sealing at point 26, the $C_2I_4$ contained in the side-arm is heated and maintained at 220° C. for about four minutes to evolve the iodine required. The envelope is then tipped-off short at point 28.

Figure 3:
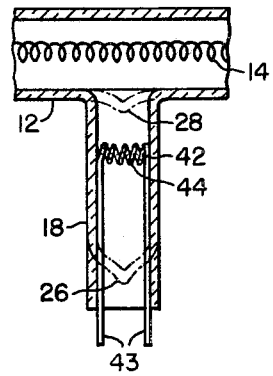
FIG. 3 illustrates a fragmentary view of the lamp, the evacuating tubulation, and a self-resistive tugnsten heating member coating with the halogen compound and supported within the evacuating tubulation.

In still another embodiment as shown in FIG. 3 a self-resistive member 42 formed of tungsten or similar material is supported within the evacuating tubulation 18. This member 42 has lead-ins 43 brought through the tubulation which are adapted to be connected to a source of electrical energy for heating the support member 42. The support member 42 can be a coil or a filament and has deposited thereon a coating 44 of about 1.8 milligrams of $C_2I_4$. The coating 44 is applied to the support member 42 by dipping it into solution prepared by dissolving 0.5 grams of $C_2I_4$ in 10 milliliters of benzene. After drying the coated support member 42 is then inserted in the evacuating tubulation 18. The evacuation and argon filling procedure are carried out and after tipping-off the system at point 26 an electric current is passed through the tungsten member 42 to heat the $C_2I_4$ to about 220° C. for about four minutes to allow the requisite amount of iodine to diffuse into the lamp envelope. The final seal is then made at 28.

Figure 4:
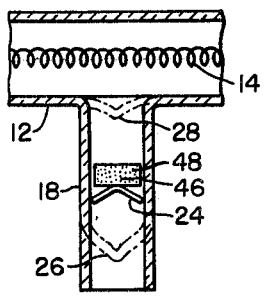
FIG. 4 illustrates a fragmentary view of the lamp, the evacuating tubulation, and a non-reactive support member coated with the halogen compound and supported within the evacuating tubulation.

In yet another embodiment as seen in FIG. 4 a non-reactive member 46 of glass has a coating 48 applied by dipping the support member 46 in the above prepared $C_2I_4$ solution. The coated member 46 after drying is inserted into the evacuating tubulation 18. A retaining clip 24 of tungsten is used to support the coated member 46 within the tubulation 18.

Other halogen compounds that can be used in the practice of the present invention include carbon tetraiodide, diodoacetylene, hexabromoethane, carbon tetrabromide, and hexachloroethane. These compounds can be substituted for the tetraiodoethylene in the specific examples depending on the particular halogen element desired. It should be understood that the foregoing compounds are merely illustrative and other compounds can be substituted therefor.

The aforementioned organic halogen compounds decompose at different temperatures as follows: diodoacetylene above 188° C., hexabromoethane above 210° C., and carbon tetrabromide above 190° C. The lamp volume and dosage desired will determine the amount of the organic halogen compound used. The temperature can be increased to speed up the time required to evolve a particular dosage.

Many other methods of presenting and heating the halogen compounds within the connected system will be readily apparent to one skilled in the art. Such a method would be to use a halogen compound coated member of a particular material and radio frequency heating means to heat the member and thereby voltilize the compound coated thereon.

The lamp specified in the preferred embodiments has a volume of 3.5 cc. and operates at 500 watts and 120 volts. Quartz-iodine lamps and other halogen containing lamps have flexible design parameters, and bulb-shaped lamps as well as tubular lamps can be produced. These lamps operate at a wide range of power ratings.

It will be recognized that the amount of halogen element and the particular compound utilized is what determines the variable factors of heating time and the amount of the particular halogen compound that has to be included. In general the greater the amount of halogen compound used the less the heating time required to evolve a desired amount of the halogen.

While the preferred embodiment relies on natural diffusion to transport the halogen vapor from the interconnected system to the lamp envelope proper, the lamp envelope can be cooled to insure faster transport and condensation of the halogen in the lamp envelope. The lamp can be cooled in liquid nitrogen. This will cryogenically pump the evolved vapor into the cooled lamp envelope.

The connected system containing the halogen compound in any of the described embodiments can be cooled for lamp bake-out during evacuation. This will prevent the halogen compound from decomposing at this time. The cooling means would then be removed to allow heating the halogen compound.

It will be recognized that a novel and improved method of dosing an incandescible lamp with an accurately predetermined about of a halogen has been provided; and this method is adaptable to efficient production techniques.

While the preferred embodiments of the method have been described in detail, it is to be understood that the invention is not to be limited thereto or thereby.

We claim as our invention:

1. The method of dosing with a predetermined pressure of inert gas and a predetermined amount of selected halogen a partially fabricated lamp comprising a vitreous light-transmitting envelope, an incandescible tungsten filament supported within said envelope and connected to electrical lead-ins sealed through said envelope, and an exhaust and gas-fill arm extending from and opening into said envelope, said method comprising the following steps:
   (a) placing into said gas-fill arm a predetermined amount of selected halogen-containing compound which is heat decomposable to release as a gas substantially only the halogen component of said compound,
   (b) evacuating said partially fabricated lamp and said gas-fill arm,
   (c) filling said envelope and said gas-fill arm with a predetermined pressure of said inert gas,
   (d) sealing off said gas-fill arm at a point removed from the area where said gas-fill arm opens into said envelope,
   (e) heating said halogen compound to a predetermined temperature to evolve a predetermined amount of the said halogen as a gas, which gas diffuses throughout said gas-fill arm and said envelope while leaving in said gas-fill arm the non-gaseous residue of said decomposed compound, and
   (f) tipping-off said envelope proximate the area where said gas-fill arm opens into said envelope to separate said gas-fill arm which contains the non-gaseous residue of said decomposed compound.

2. The method as specified in claim 1, wherein said selected heat decomposable halogen-containing compound is tetraiodoethylene, carbon tetraiodide, diodacetylene, hexabromoethane, carbon tetrabromide, hexachloroethane, or mixtures thereof.

3. The method as specified in claim 1, wherein said gas-fill arm comprises an evacuating tubulation having a side-arm chamber opening therein and projecting therefrom.

4. The method as specified in claim 1, wherein said halogen-containing compound is disposed within a generally cup-shaped member which is supported within said gas-fill arm.

5. The method as specified in claim 1, wherein said gas-fill arm comprises an evacuating tubulation and said halogen-containing compound is coated onto a support member supported within said evacuating tubulation.

6. The method as specified in claim 5, wherein the said support member is a self-resistive heating member, and conductive lead-ins connecting to said heating member are sealed through said gas-fill arm and are adapted to be connected to an electrical energy source.

7. The method of dosing with a predetermined pressure of inert gas and a predetermined amount of selected halogen a partially fabricated lamp comprising a vitreous light-transmitting envelope, an incandescible tungsten filament supported within said envelope and connected to electrical lead-ins sealed through said envelope, and an exhaust and gas-fill arm extending from and opening into said envelope, said method comprising the following steps:
   (a) placing into said gas-fill arm a predetermined amount of selected halogen-containing compound which is heat decomposable to release as a gas substantially only the halogen component of said compound, wherein said compound is tetraiodoethylene, carbon tetraiodide, diodacetylene, hexabromoethane, carbon tetrabromide, hexachloroethane, or mixtures thereof,
   (b) evacuating said partially fabricated lamp and said gas-fill arm,
   (c) filling said envelope and said gas-fill arm with a predetermined pressure of said inert gas, (d) sealing off said gas-fill arm at a point removed from the area where said gas-fill arm opens into said envelope, (e) heating said halogen compound to a predetermined temperature to evolve a predetermined amount of the said halogen as a gas, which gas diffuses throughout said gas-fill arm and said envelope while leaving in said gas-fill arm the non-gaseous residue of said decomposed compound, and (f) tipping-off said envelope proximate the area where said gas-fill arm opens into said envelope to separate said gas-fill arm which contains the non-gaseous residue of said decomposed compound.

References Cited

UNITED STATES PATENTS

| | | | |
|---|---|---|---|
| 1,826,383 | 10/1931 | Smalley | 316—20 |
| 1,585,803 | 5/1926 | Van Voorhis | 316—3 |
| 975,040 | 11/1910 | Hopfelt | 316—15 |
| 1,265,204 | 5/1918 | Jaeger | 316—3 |

JOHN E. CAMPBELL, Primary Examiner

R. CRAIG, Assistant Examiner

U.S. Cl. X.R.

316—20